United States Patent
Piramoon

[11] Patent Number: 5,876,322
[45] Date of Patent: Mar. 2, 1999

[54] HELICALLY WOVEN COMPOSITE ROTOR

[76] Inventor: Alireza Piramoon, 3836 Shasta Dr., Santa Clara, Calif. 95051

[21] Appl. No.: 792,051

[22] Filed: Feb. 3, 1997

[51] Int. Cl.$^6$ .................................. B04B 5/02; B04B 7/08
[52] U.S. Cl. ................................................. 494/16; 494/81
[58] Field of Search .................................. 494/12, 16, 20, 494/31, 33, 43, 81, 85; 74/572, 573 R, 574

[56] References Cited

U.S. PATENT DOCUMENTS

| | | | |
|---|---|---|---|
| 3,248,046 | 4/1966 | Feltman, Jr. et al. | 494/16 |
| 4,468,269 | 8/1984 | Carey | 494/81 X |
| 4,701,157 | 10/1987 | Potter | 494/16 |
| 4,738,656 | 4/1988 | Piramoon et al. | 494/16 X |
| 4,781,669 | 11/1988 | Piramoon | 494/16 |
| 4,790,808 | 12/1988 | Piramoon | 494/81 |
| 4,817,453 | 4/1989 | Breslich, Jr. et al. | 494/16 X |
| 4,824,429 | 4/1989 | Keunen et al. | 494/16 |
| 4,860,610 | 8/1989 | Popper et al. | 494/16 X |
| 4,991,462 | 2/1991 | Breslich, jr. et al. | 494/16 X |
| 5,057,071 | 10/1991 | Piramoon | 494/16 |
| 5,362,301 | 11/1994 | Malekmadani et al. | 494/16 |
| 5,382,219 | 1/1995 | Malekmadani | 494/16 |
| 5,505,684 | 4/1996 | Piramoon | 494/16 |
| 5,562,582 | 10/1996 | Malekmadani | 494/81 X |
| 5,601,522 | 2/1997 | Piramoon | 494/81 X |
| 5,643,168 | 7/1997 | Piramoon et al. | 494/16 |

FOREIGN PATENT DOCUMENTS

| | | | |
|---|---|---|---|
| 44-18793 | 8/1969 | Japan | 494/81 |
| 64-11659 | 1/1989 | Japan | 494/81 |
| 2097297 | 11/1982 | United Kingdom | 494/16 |

*Primary Examiner*—Charles E. Cooley
*Attorney, Agent, or Firm*—Townsend and Townsend and Crew

[57] ABSTRACT

Composite fibers are woven into helical fabric strips. These helical fabric strips wind upon one another as a helix to form a cylinder. When the helical strips are impregnated with resin, heated to the thermoset temperature of the resin, and compressed and cured, a cylindrical composite body results having the individual fibers of the body only arrayed radially or circumferentially. This structure can then be provided with sample tube apertures, usually after curing the cylindrical structure. Dependent upon the rate of differential advance of the weft threads, the woven cloth helically stacks to a cylinder of variable diameter—usually about a cylindrical central aperture in the cylinder.

7 Claims, 8 Drawing Sheets

HELICALLY WOVEN COMPOSITE ROTOR

This invention relates to rotors preferably for centrifuges. Specifically, a composite material rotor is disclosed in which woven fabric having a helical stacked pattern is utilized to dispose the warp threads of the fabric for circumferential reinforcement and preferably the weft threads of the fabric for radial reinforcement.

BACKGROUND OF THE INVENTION

Centrifuge rotors have typically been constructed from metal forgings. Metals are known to be isotropic in their strength of material properties. Their resistance in tension, compression, shear, and bending is for the most part uniform in all differing directions of possible stress. Taking the case of titanium, the resistance is roughly uniform—about 250,000 pounds per square inch.

Centrifuge rotors built of resin reinforced composite fibers are known. Composite fibers are anisotropic in their strength of material properties. Taking the case of titanium, composite fibers have much greater tensile strength (up to five times or 1,250,000 psi) and are much lighter (about one-third the weight of titanium). The resistance of composite fibers in compression, shear, and bending is another matter. The fibers have virtually no resistance to these forces—especially when the forces are applied length-wise of an individual fiber.

The building of composite rotors—especially centrifuge rotors—is known. In the most common prior art constructions, resin impregnated fiber tape and/or fabric is cut in discrete discs. The discrete discs are stacked one upon another, with the discs disposed normal to the spin axis of the ultimately constructed rotor. Typically, as each discrete disc is stacked, the angularity of the fiber of the discrete disc is varied with respect to the angularity of the fiber in the disc on to which it is stacked. This stacking process with varied angular alignment continues until a cylindrical rotor body is fabricated.

In another composite rotor construction technique, fibers have been compression molded. Specifically, fibers are placed with a mold in so-called sheet molding compound, having a mixture of fiber and resin. The sheet molding compound has randomly disposed fibers all confined within a plane. The fibers are then compressed and cured. Although the fibers undertake some migration during the compression molding, the fibers remain largely with their horizontal disposition.

In both of these techniques, the fibers are not optimally aligned so that their superior isotropic properties in tension can be utilized. A brief discussion of the dynamic forces extant upon a spinning centrifuge rotor can emphasize this point.

Taking the case of a spinning centrifuge rotor, the rotor resists the centrifugal forces radially and circumferential. In radial resistance, the rotor uses the continuity of material across the spin axis. In circumferential resistance, the material of the rotor acts in hoop tension around the circumference of the rotor.

Going back to the two known constructions of composite centrifuge rotors, it will be seen that many of the fibers are placed in dispositions other than radial or circumferential. In the use of composite discs, it will be understood that most fibers of the disc will not have a radial alignment. Further, none of the fibers of the discs will have circumferential alignment.

Nevertheless, the resulting rotors are remarkably strong in resisting centrifugal stress imposed parallel to the planes of the disc layers. The varied angular alignment of fibers in the discrete discs making up the rotor imparts to the disc a resistance which I term as "quasi-isotropic" resistance. The resin impregnated fiber of each layer which happens to be optimally disposed (usually radially disposed for resistance to centrifugal stresses) imparts to the fibers of adjacent layers resistance to centrifugally generated stress. Thus, the fibers when fastened with resin in effect reinforce each other through the resin, even though the fibers being reinforced are not optimally aligned (either radially or circumferentially) to resist the stress.

SUMMARY OF THE INVENTION

Composite fibers are woven into helical fabric strips. These helical fabric strips wind upon one another as a helix to form a cylinder. When the helical strips are impregnated with resin, heated to the thermoset temperature of the resin, and compressed and cured, a cylindrical composite body results having the individual fibers of the body only arrayed radially or circumferentially. In the weaving of the helical strips, the warp threads are advanced from a loom with either differential velocities, differential thickness, or both. In one embodiment, warp threads are given a velocity gradient which uniformly varies from one side of the loom where advance is slow to an opposite side of the loom where advance is fast. During this differential advance of the respective warp threads, the weft threads are woven across the warp threads. In another embodiment, the warp threads to the inside of the helix are given smaller diameter and the warp threads to the outside of the helix given larger diameter. In the preferred embodiment, the weft threads extend normal to the warp threads and are conventionally woven to produce cloth. The resultant composite cloth is longer on the edge having the fast advanced warp threads, shorter on the edge having the slow advanced warp threads, and uniformly varies in length between the respective edges. When stacked, this cloth helically disposes itself into a cylinder with the radius of the cylinder varying as a function of the rate of differential advance of the respective warp threads. Presuming that the formed cylinder is impregnated with resin and cured, a cylindrical composite structure results. This structure can then be provided with sample tube apertures, usually after curing the cylindrical structure. Dependent upon the rate of differential advance of the warp threads, the woven cloth helically stacks to a cylinder of variable diameter—usually about a cylindrical central aperture in the cylinder.

The disclosed process has no waste of materials, is not laborious, and has all fibers optimally disposed for resistance to centrifugal forces. In particular, the warp threads are disposed circumferentially where they may optimally resist centrifugal forces through hoop tension, and the weft threads—when woven normal to the warp threads—are all disposed radially where they may resist centrifugal forces through radial tension. Variations of this rotor construction technique are disclosed, including fabrication of a fixed angle rotor having a frustum contoured profile and the fabrication of a solid cylindrical rotor.

DESCRIPTION OF THE PREFERRED EMBODIMENT

Figure 1:
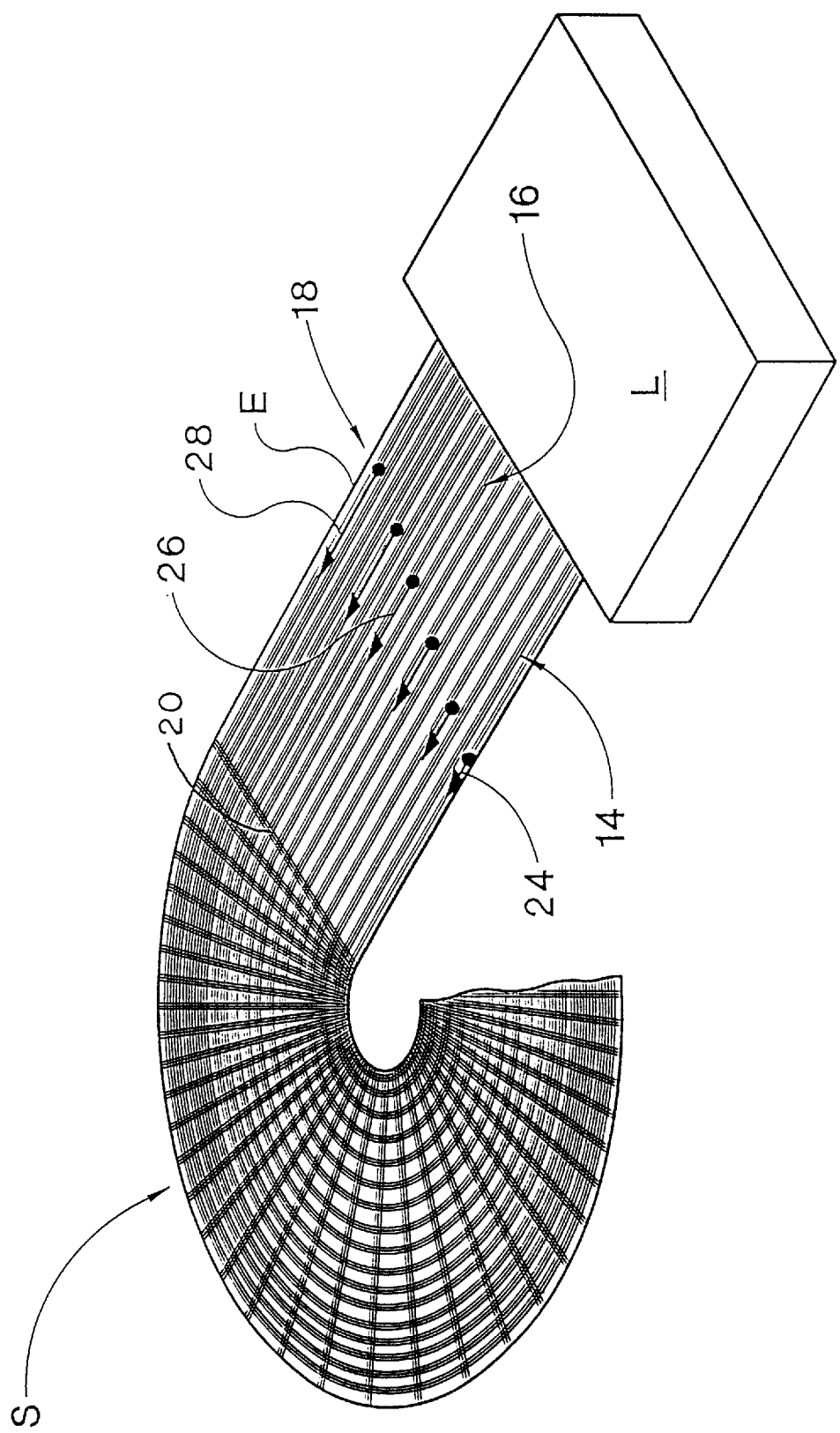
FIG. 1 is a schematic of a fabric weaving loom differentially advancing warp fibers with the warp fiber on one edge being advanced slowly, the warp fiber on the opposite edge being advanced faster, and the warp threads between the respective edge warp threads having an evenly distributed gradient of advance.

Referring to FIG. 1, loom L is schematically shown having advancing warp threads E. Warp threads E advance with a differential velocity. Specifically and making immediate reference to vectors representing the respective velocities, inside warp threads 14 advance at relatively slow velocity 24, outside warp threads 18 advance at relatively fast velocity 28, and medial warp threads 16 advance at intermediate velocity 26.

Once the differential advancement of inside warp threads 14, medial warp threads 16 and outside warp threads 18 is completed, weft threads 20 are conventionally woven. Because of the differential lengths of the inside warp threads 14, medial warp threads 16 and outside warp threads 18, an arcuate composite cloth strip S results.

Figure 2:
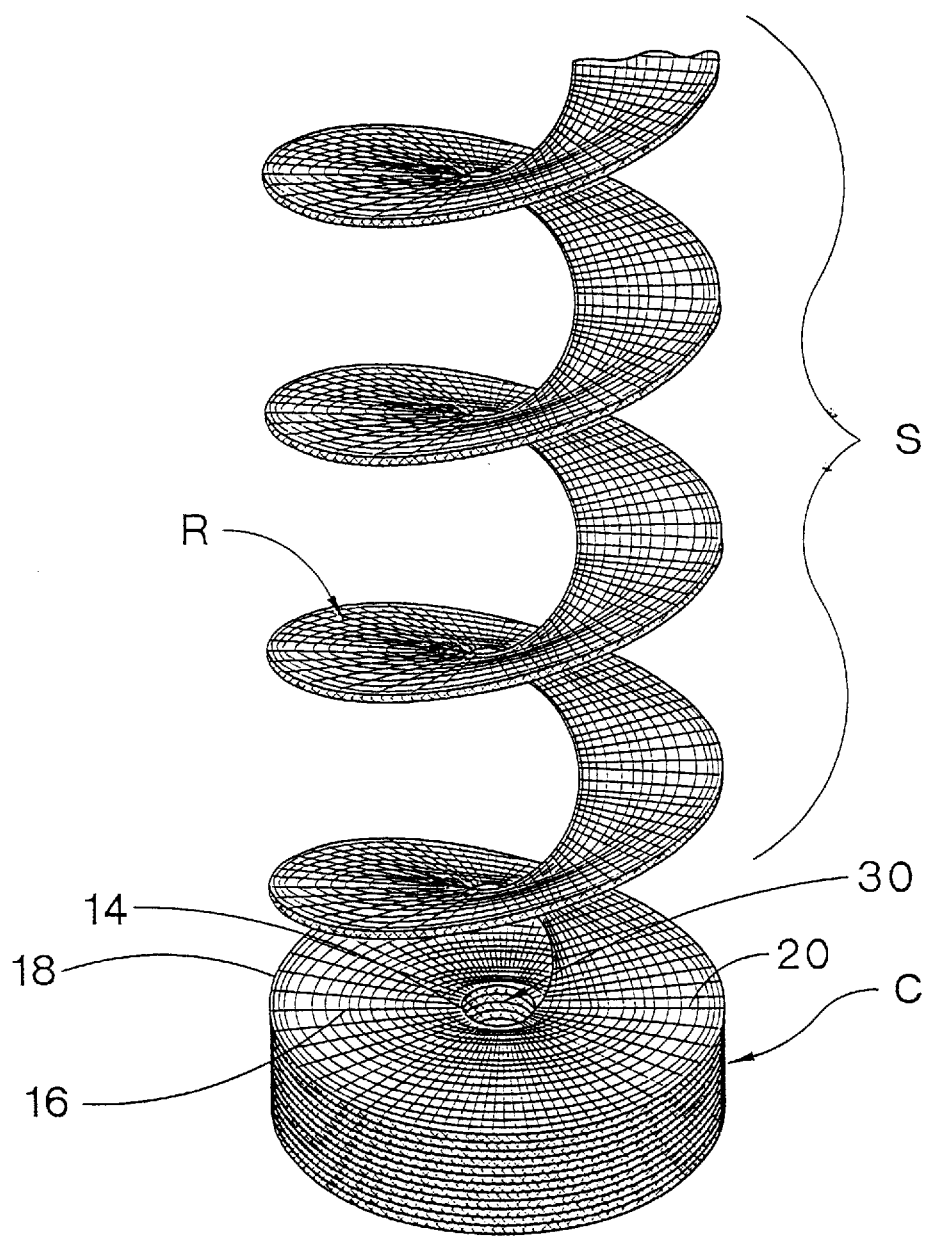
FIG. 2 is a perspective view of the fiber produced by the loom of FIG. 1 being helically stacked to form a cylinder, it being understood that the produced fabric can be resin impregnated either before or after such stacking.

Referring to FIG. 2, stacking of arcuate composite cloth strip S into cylinder C is illustrated. Cylinder C is shown having cylindrical aperture 30 in the center. It will be understood that arcuate composite cloth strip S is impregnated with resin R, compressed, heated beyond the thermoset point of resin R, and cured. There results cylinder C having inside warp threads 14, medial warp threads 16 and outside warp threads 18—all disposed circumferentially—and weft threads 20, all disposed radially. Consequently, when cylinder C is rapidly rotated, it has optimal resistance in radial tension and in hoop tension to the forces of centrifugation.

Figure 3:
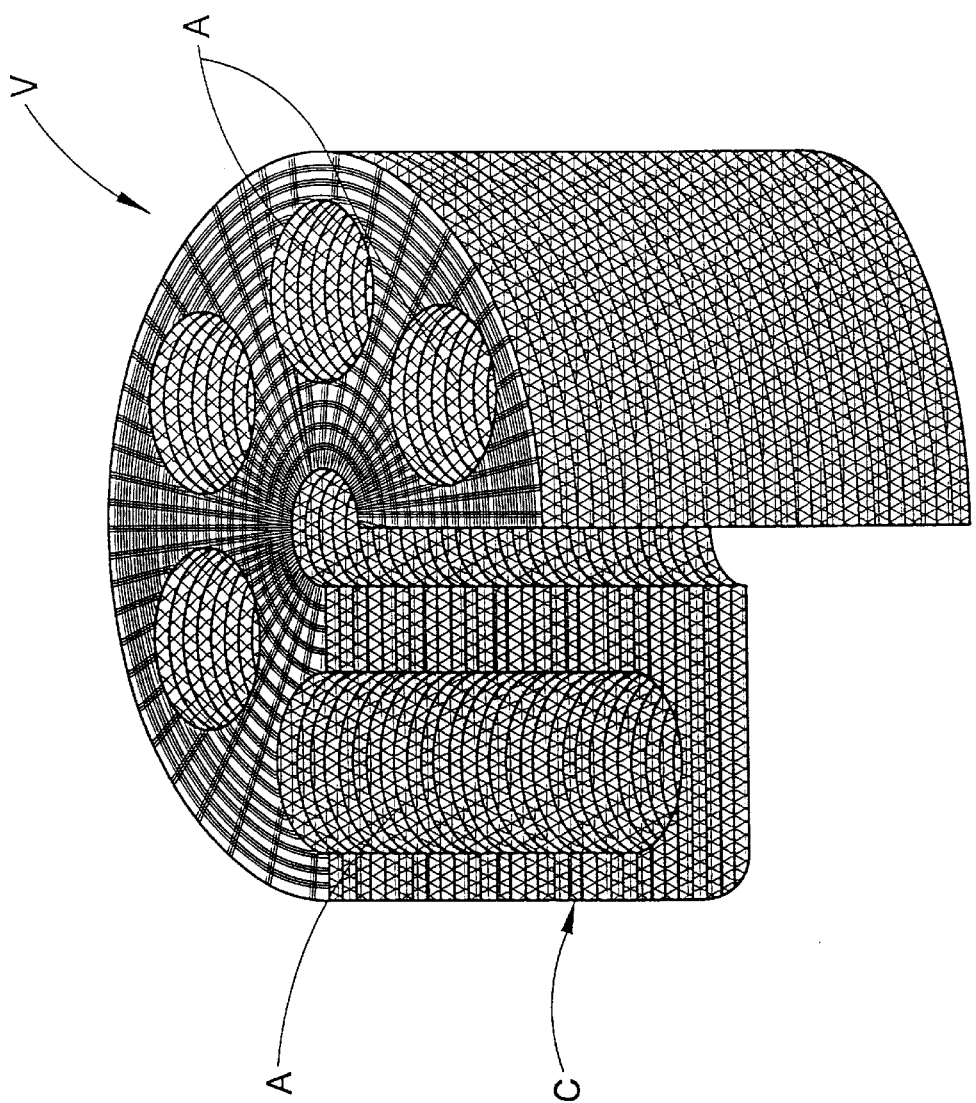
FIG. 3 is a view of the finished rotor construction resulting from the stacking illustrated in FIG. 2, illustrating the circumferential disposition of all the warp threads and the radial disposition of all the weft threads to produce a rotor construction in which all threads are optimally disposed for resistance to circumferential forces parallel to the plane of the woven fabric.

Referring to FIG. 3, cylinder C has sample tube apertures A machined within the material. Vertical tube centrifuge rotor V results. Spindles may be conventionally mounted for attachment to centrifuges of varying designs; these spindles are not illustrated here.

Figure 4:
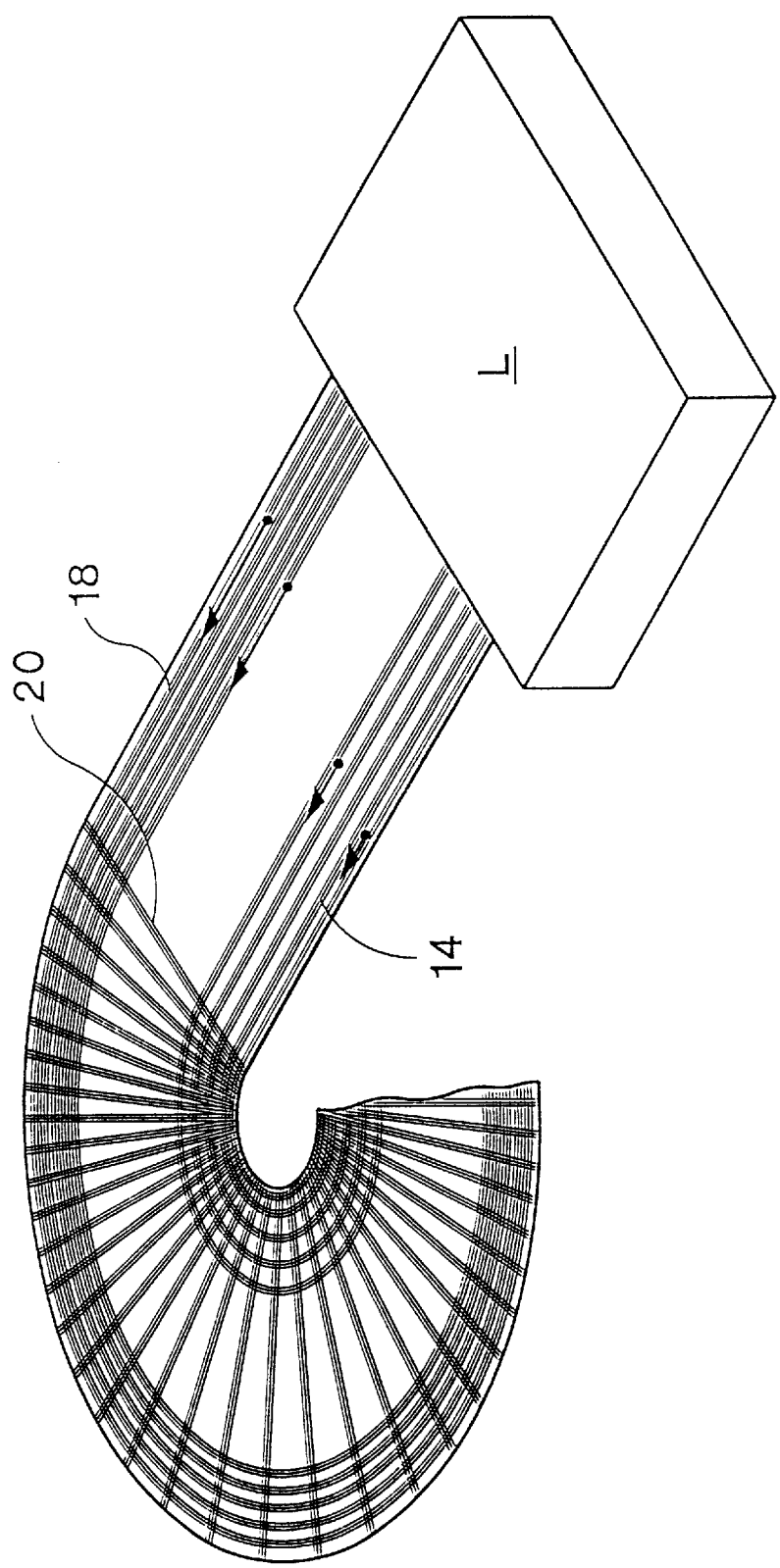
FIG. 4 is a schematic of a fabric weaving loom similar to FIG. 1, with vectors illustrating the fast advance of warp threads on either side of the cloth being woven with slower advance of the warp threads toward the center of the cloth and the omission of warp threads in the central area of the cloth.

Referring to FIG. 4, an alternate construction of arcuate composite cloth strip S is illustrated. In this construction, inside warp threads 14 advanced at relatively slow velocity 24 and outside warp threads 18 advanced at relatively fast velocity 28 are present; medial warp threads 16 are missing. As before, weft threads 20 are placed.

It should be apparent that the respective relative ratio between relatively slow velocity 24 and relatively fast velocity 28 can be varied. For example, if this ratio is large, arcuate composite cloth strip S will have a small radius of curvature. Alternately, if this ratio is small, arcuate composite cloth strip S will have a smaller radius of curvature. Moreover, by effecting a continuous variation while arcuate composite cloth strip S is being woven, the stacking of the cloth to frustum shaped cone CF results. This much is shown in FIG. 5.

Figure 5:
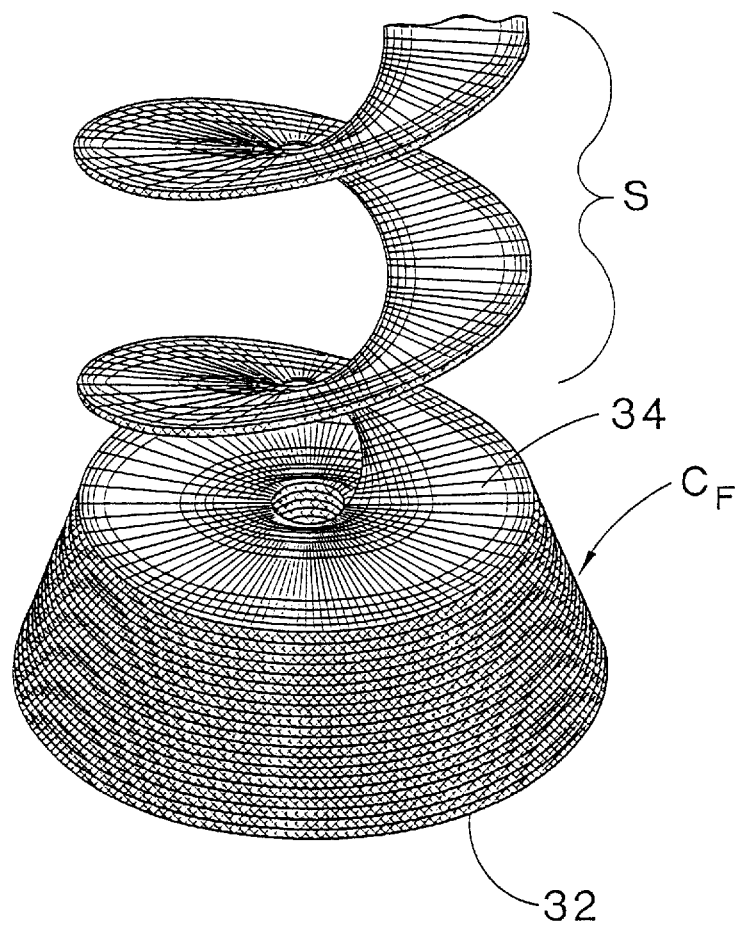
FIG. 5 is a perspective view of fabric being woven from a loom similar to that illustrated in FIG. 4, with the vectors of warp thread advance being varied to produce a frustum shape helical stack to the woven cloth.

Referring to FIG. 5, initially arcuate composite cloth strip S had a large radius of curvature. This produced frustum base 32. Later, arcuate composite cloth strip S was woven with a smaller radius of curvature. This produces truncated frustum apex 34.

Figure 6:
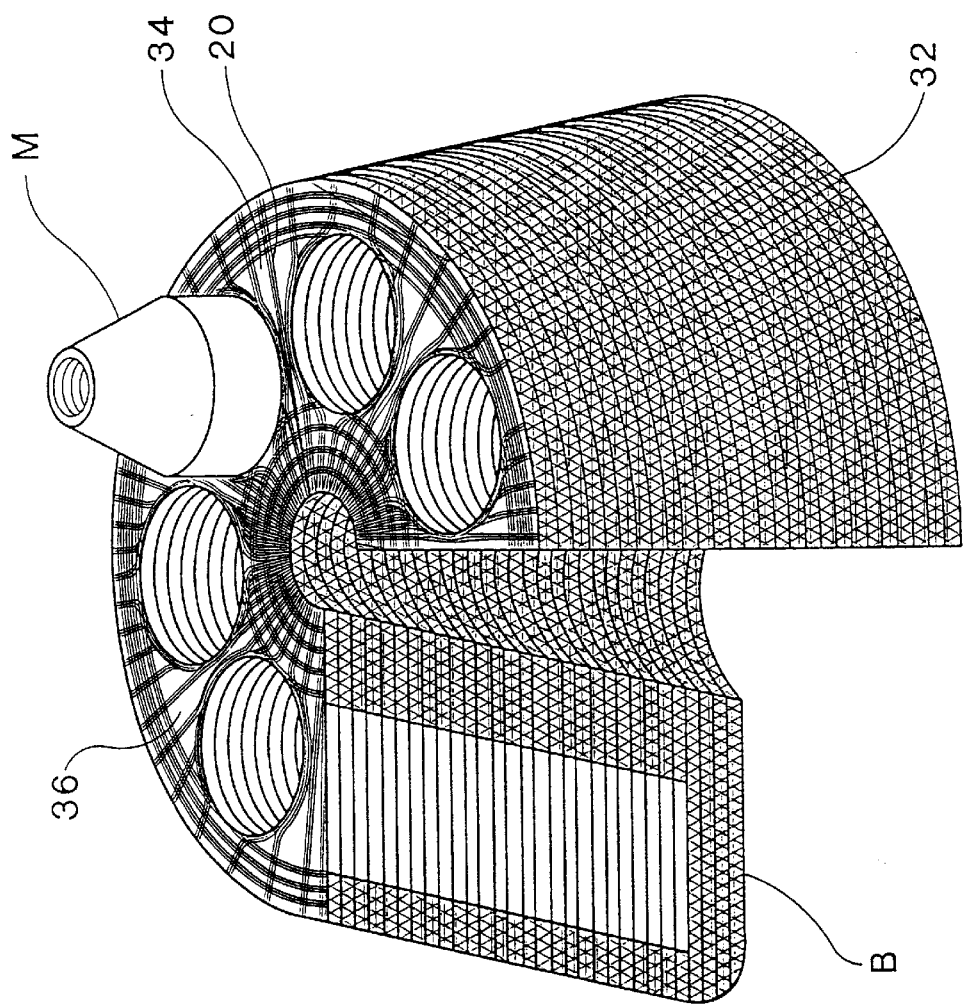
FIG. 6 is a cross-section of a fixed-angle rotor having sample tube apertures formed by a mandrel within the arcuate composite cloth strip helically stacked.

Referring to FIG. 6, weft threads 20 are shown with relative wide spacing 36 between successive weft threads 20. This enables a mandrel M to form the respective sample tube apertures A. It is to be noted that with this construction, weft threads 20 pass about sample tube apertures A in effect reinforcing sample tube apertures A. In this embodiment, bottom B is conventionally provided with weft threads 20 for closing sample tube apertures A as illustrated.

Figure 7:
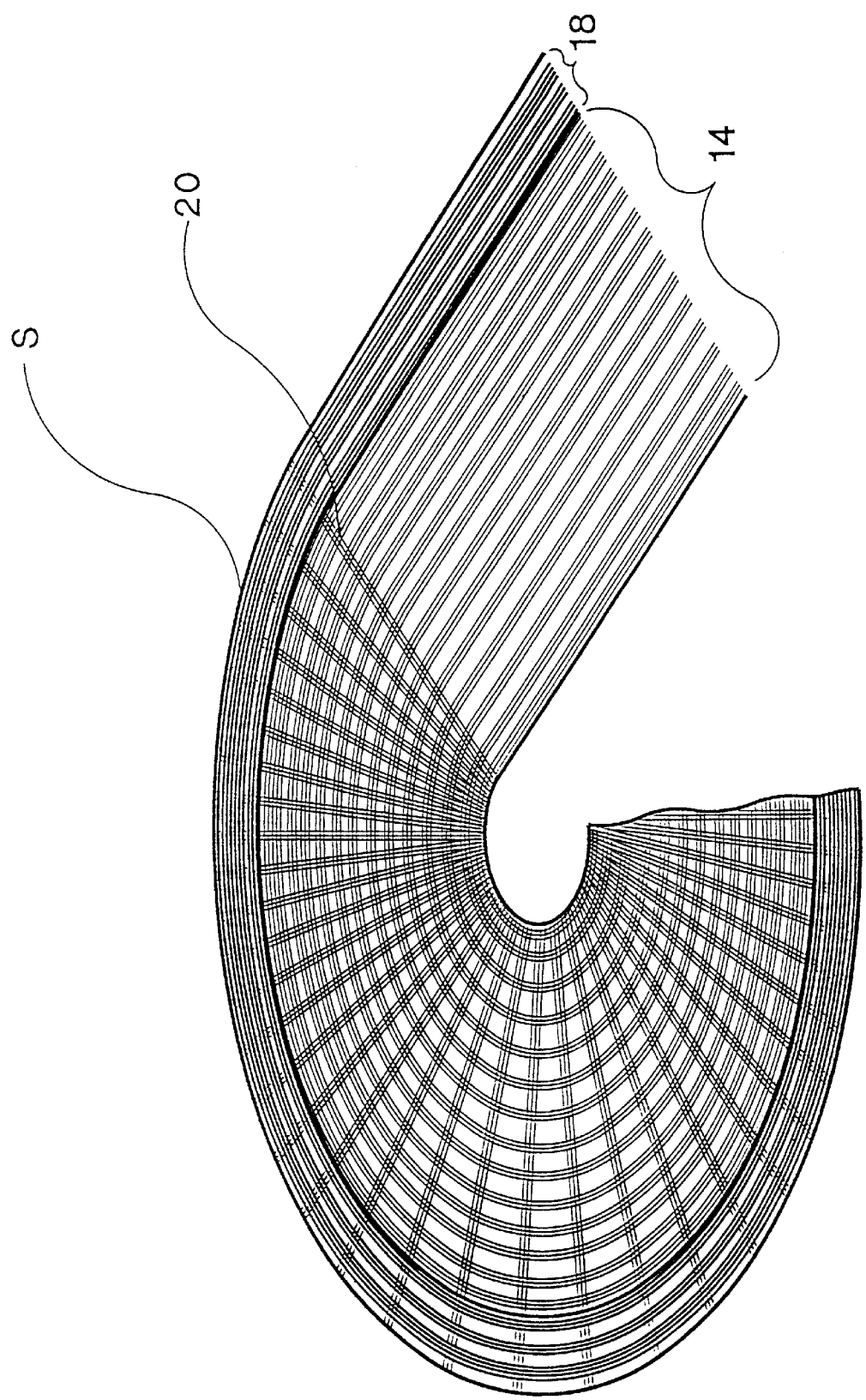
FIG. 7 is a schematic similar to FIG. 1, with the loom being omitted illustrating both the use of warp fibers of differential thickness and differential strength in the construction of the rotor.
Figure 8:
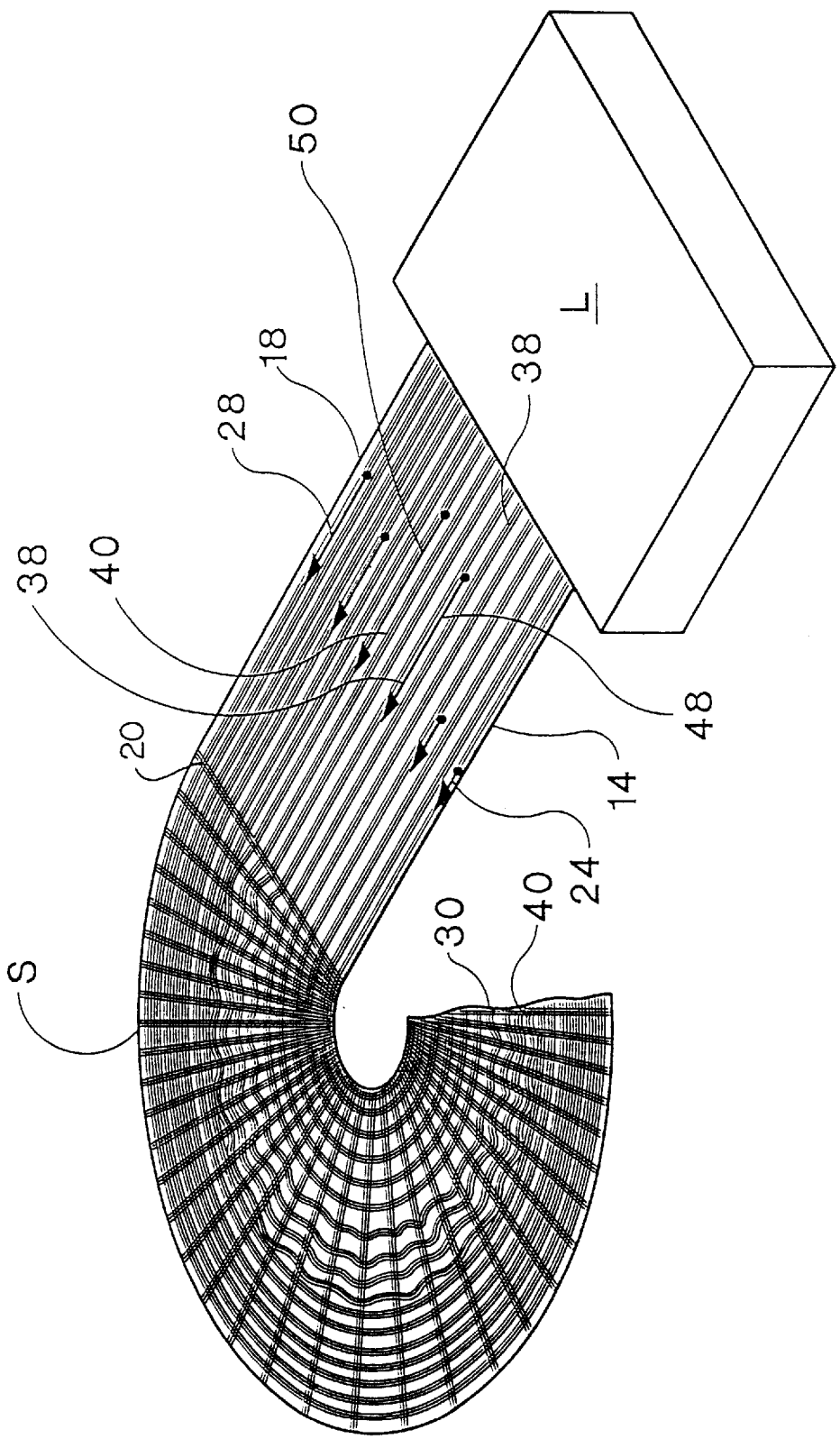
FIG. 8 illustrates warp fiber advancement from a loom with other than a differential uniform velocity across the cloth strip, with medially placed warp threads having a longer length to enable the formation of sample tube apertures within the rotor.

Referring to FIGS. 7 and 8, two additional variations can be illustrated. First, in FIG. 7, the relative strength properties of the composite fiber utilized to create the rotor can be varied. For example, outside warp threads 18 can be of high tension fibers while inside warp threads 14 can be of lower tension capacity—and lower cost.

Referring to FIG. 8, an additional variation is shown. Specifically, inside warp threads 14 are woven with relatively slow velocity 24. Outside warp threads 18 are woven with relatively fast velocity 28. First medial warp threads 38 are woven with high velocity 48, and second medial warp threads 40 are woven with highest velocity 50.

Referring further to FIG. 8, it will be seen that the respective first medial warp threads 38 and second medial warp threads 40 form a loose weft. This loose configuration allows these respective first medial warp threads 38 and second medial warp threads 40 to be forced to one side during the insertion of mandrels for forming sample tube apertures A.

It can be seen from the disclosed embodiments that the technique here disclosed is especially useful for the construction of centrifuge rotors having superior resistance to the forces of centrifugation.

What is claimed is:

1. A rotor construction comprising in combination:

a woven cloth having fiber warp threads running parallel to the edges of the cloth, and weft threads running across the warp threads;

the warp threads having differential lengths to impart to one portion of the cloth taken along a first warp thread a different length than another portion of the cloth taken along a second thread;

said cloth stacked in a helical pile with the warp threads running circumferentially of the helical pile, and the weft threads disposed across the warp threads;

the stacked cloth being impregnated with cured resin to form a rotor body; and the rotor body having at least one sample tube aperture defined therein.

2. The rotor construction of claim 1 and further comprising:

the fiber warp threads are disposed approximately normal to the fiber weft threads; and the fiber weft threads are disposed radially of the helical pile.

3. The rotor construction of claim 1 and wherein:

the helical pile forms a cylinder.

4. The rotor construction of claim 1 and wherein:

the helical pile forms a cylinder with a central aperture.

5. The rotor construction of claim 1 and wherein:

the helical pile has a frustum shaped exterior profile.

6. The rotor construction of claim 1 and wherein:

the warp threads of the cloth include central warp threads woven with slack relative to the side warp threads.

7. The rotor construction of claim 1 and further comprising:

the weft threads having large spatial intervals therebetween.

* * * * *